US005605518A

United States Patent [19]

[11] Patent Number: 5,605,518

[45] Date of Patent: Feb. 25, 1997

Kogure et al.

[54] PLANETARY GEAR DEVICE

[75] Inventors: Kiyoshi Kogure, Ibaraki-ken; Hiroshi Agata, Ryugasaki; Naoyuki Tanaka, Abiko, all of Japan

[73] Assignee: Hitachi, Ltd., Tokyo, Japan

[21] Appl. No.: 216,450

[22] Filed: Mar. 23, 1994

[30] Foreign Application Priority Data

Mar. 26, 1993 [JP] Japan .................................. 5-067871

[51] Int. Cl.[6] .................................................. F16H 57/08

[52] U.S. Cl. ............................... 475/344; 74/457; 74/462

[58] Field of Search ............................ 74/457, 460, 462; 475/344

[56] References Cited

U.S. PATENT DOCUMENTS

| | | | |
|---|---|---|---|
| 2,176,956 | 10/1939 | Cook et al. | 74/462 |
| 2,306,854 | 12/1942 | Zimmer | 74/462 |
| 2,403,492 | 7/1946 | Boor | 74/462 |
| 4,280,376 | 7/1981 | Rosen | 475/344 X |
| 5,271,289 | 12/1993 | Baxter, Jr. | 74/462 |

*Primary Examiner*—Rodney H. Bonck
*Assistant Examiner*—Peter Kwon
*Attorney, Agent, or Firm*—Antonelli, Terry, Stout & Kraus, LLP

[57] ABSTRACT

A planetary gear device includes a sun gear, planet gears to be meshed with the sun gear and an internal gear to be meshed with the planet gears each having a tooth profile formed to an involute curve, wherein tooth surfaces on one side of the planet gears meshing with the sun gear and tooth surfaces on the other side of the planet gears meshing with the internal gear are respectively corrected by different amounts of correction on the basis of deformation amounts of teeth of the planet gears caused by meshes with the sun gear and the internal gear so that rotary motion can be smoothly transmitted when the tooth faces of the planet gears meshed with the sun gear and the tooth faces of the planet gears meshed with the internal gear are elastically deformed by the mesh thereof.

9 Claims, 4 Drawing Sheets

PLANETARY GEAR DEVICE

BACKGROUND OF THE INVENTION

1. Field of the Invention

The present invention relates to a planetary gear drvice, and more specifically, to a planetary gear device having a tooth profile effective to reduce vibration and noise.

2. Description of the Prior Art

In a power transmission gear, since the gear is composed of an elastic material, it is impossible to avoid the deflection of the teeth thereof when the gear is operated with a load. Intrinsically, however, if an involute gear does not maintain a proper involute curve when it transmits rotary motion, it cannot smoothly transmit the rotary motion. The rotation of the gear is made irregular due to the deflection of the teeth and thus vibration and noise are produced and the life of the gear is shortened. Then, as proposed in, for example, Japanese Patent Unexamined Publication No. 63-180766, the deflection of the teeth of a gear operated with a load is presupposed and previously corrected so that rotary motion can be transmitted smoothly in the operation with the load.

FIG. 4 shows a sun gear and a planet gear of a planetary gear device used as a speed reduces. In this case the teeth of the gears are not deflected when no load is applied to the gears. When rotary motion is transmitted from the sun gear 1 to the planet gear 2 in the direction of an arrow, the former gear meshes with the latter gear at point a and the former is about to mesh with the latter at a point b. When no load is applied, the sun gear 1 and the planet gear 2 have the same normal pitch Pn at an adjacent tooth when measured vertically to the tooth face of the gears. The normal pitch Pn is not changed by the rotation of the gears when they are smoothly rotated. When a load is applied as shown in FIG. 5, however, the sun gear 1 meshes with the planet gear 2 at a point a in a state with great deflection (a dotted line shows the state with no deflection). On the other hand, in the meshed state at point a, the planet gear 2 has less deflection because the point a is near the dedendum of the tooth. When it is assumed that the tooth of the planet gear 2 is not deflected for the purpose of simplification, the tooth face of the tooth next to the meshed tooth of the sun gear 1 is spaced apart from the meshed tooth thereof by a distance Pn and the tooth face of the tooth next to the meshed tooth of the planet gear 2 is also spaced apart from the meshed point by a distance Pn. As a result, the next teeth collide against each other at the point b, by which vibration and noise are caused.

FIG. 6 illustrates the teeth further meshing with each other. Although the teeth are completely meshing together at point b, they are just ending their meshing at point a. Since the teeth are also meshing at point a just before this state, the load is divided into the two points and half the entire load is applied to the respective points. At the moment when the mesh of the teeth at point a is ended, however, the load is applied only to the point b with the tooth of the planet gear 2 having a loaded point far from the dedendum which causes great deflection and deformation from a state without deflection (shown by a dotted line). As a result, the teeth collide with each other at point a where the meshing ends which causes vibration and noise.

In FIG. 7 planet gear 2 meshes with an internal gear 5 in a slightly different manner than in FIGS. 4–6. Although the teeth of the planet gear 2 are completely meshing with the internal gear 5 at point a, they are about to be meshed together at a point b. Although point a is located at a high position from the dedendum of the internal gear 5, the dedendum has a relatively large tooth thickness which causes the internal gear 5 to be less deflected. On the other hand, since the point a is located at a position which is not as high from the dedendum of the planet gear 2, the planet gear 2 is also less deflected. Therefore, the deflection of the teeth of the planet gear 2 and internal gear 5 are considerably smaller than when the sun gear 1 meshes with the planet gear 2 as illustrated in FIGS. 4–6.

In a planetary gear device, two kinds of meshing occur at the same time. More specifically, they are the meshing of the sun gear 1 with the planet gear 2 and the meshing of the planet gear 2 with the internal gear 5. As described above, the teeth are deflected differently by the two kinds of meshes.

To smoothly transmit rotary motion in a loaded operation, a tooth profile must be corrected to an optimum condition by taking into consideration the deflection of teeth caused by the two kinds of meshes. Nevertheless, only the tooth profile of one of the sun gear and the planet gear is conventionally corrected by only taking into consideration the deflection caused by the meshing of the sun gear with the planet gear. Moreover, the same amount of correction is effected to the opposite faces of teeth.

In the aforesaid prior art, the deflection of teeth caused by the meshing of the planet gear with the internal gear is ignored because it is considerably smaller than the deflection of teeth caused by the meshing of the sun gear with the planet gear. At present, however, the effect of the latter deflection cannot be ignored because the reduction of vibration and noise is strongly required.

SUMMARY OF THE INVENTION

To achieve the result, it is necessary to correct the tooth profile of the internal gear to compensate for the deflection of teeth caused by the meshing of the planet gear with the internal gear. In this case, however, the tool profile of the two kinds of the gears must be corrected, which is not preferable because the design, manufacture and management of parts become complex. Further, the internal gear is often machined by a pinion cutter and a plurality of cutters must be prepared in accordance with an amount of correction of the tooth profile. This correction is practically impossible.

SUMMARY OF THE INVENTION

An object of the present invention is to provide a planetary gear device having a low level of noise which is achieved by reducing impact vibration caused by the meshing of gears by properly correcting the tooth profile of the faces of the teeth of the planet gears. The above object is achieved with a planetary gear device including a sun gear, planet gears meshing with the sun gear and an internal gear meshing with the planet gears. Each planet gear has a tooth profile formed to an involute curve with tooth surfaces on one side of the planet gears meshing with the sun gear and tooth surfaces on the other side of the planet gears meshing with the internal gear being respectively corrected by different amounts of correction of the faces of each tooth based on deformation amounts of forces of the teeth of the planet gears caused by meshing with the sun gear and the internal gear so that rotary motion is smoothly transmitted when the tooth faces of the planet gears mesh with the sun gear and the tooth faces of the planet gears mesh with the internal gear produced by elastical deformation produced by the meshing with the sun and internal gears.

Since the profile of the teeth facing one side of the planet gears is corrected in accordance with the deflection caused by the meshing thereof with the sun gear and the profile of the teeth facing the opposite side of the planet gears is corrected in accordance with the deflection caused by the meshing thereof with the internal gear, an optimum correction of the profile can be performed with respect to the two kinds of meshing of the planet gears with the sun gear and the planet gears with the internal gear. Thus rotary motion can be smoothly transmitted between the sun gear and the planet gears and between the planet gears and the internal gear as well suppressing vibration caused by impact to lower the vibration and noise of the device.

DESCRIPTION OF THE PREFERRED EMBODIMENTS

Figure 1:
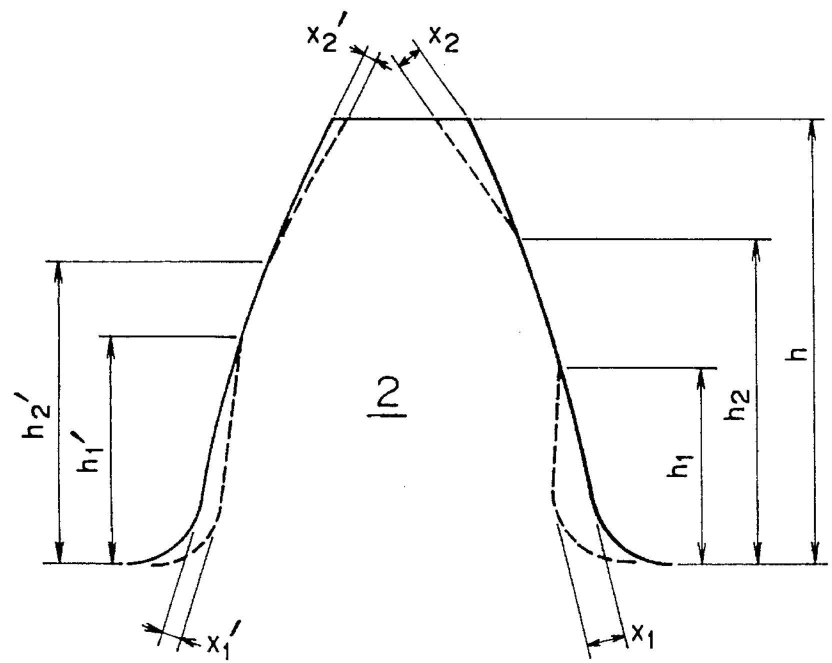
FIG. 1 is a diagram explaining the correction of the tooth profile of a planet gear of an embodiment of the present invention.

An embodiment of the present invention will be described below with reference to FIG. 1 to FIG. 5.

First, the arrangement of a planetary gear device as a primary portion of this embodiment will be described with reference to FIG. 3. A sun gear 1 is located at the center of the device which meshes with three planet gears 2. Although this embodiment shows the usual three planet gears, two to four planet gears may alternatively be used with the practice of the invention in addition to the above.

The planet gears 2 mesh with an internal gear 5 on the peripheries thereof and rotate on their own axes about pins 3, respectively. Further, the pins 3 are disposed at either equal or unequal angular intervals about the periphery by a carrier 4 depending upon the number of planet gears 2.

In a usual planetary gear device, the internal gear 5 is fixed, and when the sun gear 1 is used as an input shaft, the planetary gear device is used as a so-called speed reducer in which the revolution of the planet gears 2 or the rotary motion of the carrier 4 is an input to an output shaft. In a case in which the device is used as a speed increaser the carrier 4 is used as an input shaft and the sun gear 1 is used as an output shaft.

Further, in another method, a mechanism is generally employed in which the carrier 4 is fixed, i.e., the planet gears 2 only rotate on their axes and do not carry out revolution. In this case, when the sun gear 1 is used as an input shaft, the planet gears 2 meshing therewith only rotate on their axes and thus the internal gear 5 rotates in the direction opposite to that of the sun gear 1 and serves as an output shaft so that the planetary gear device acts as a speed reducer. Conversely, when the internal gear 5 is used as an input shaft, the sun gear 1 rotates in the direction opposite to that of the internal gear 5 so that the planetary gear device acts as a speed increaser.

Figure 3:
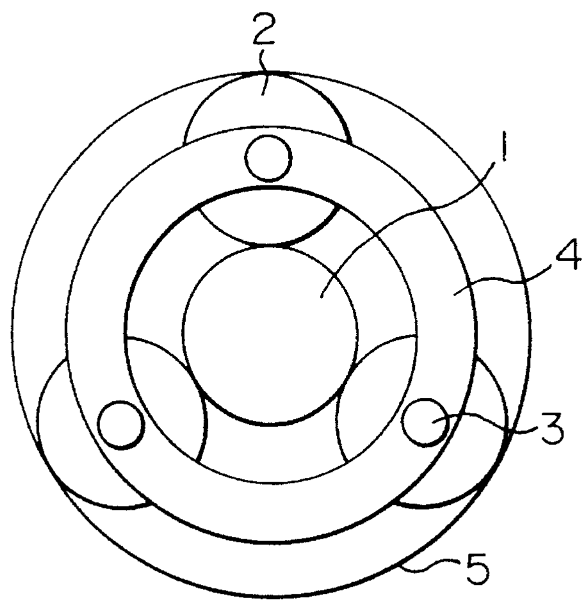
FIG. 3 is a diagram explaining the principle of the planetary gear device of the embodiment of FIG. 1.
Figure 4:
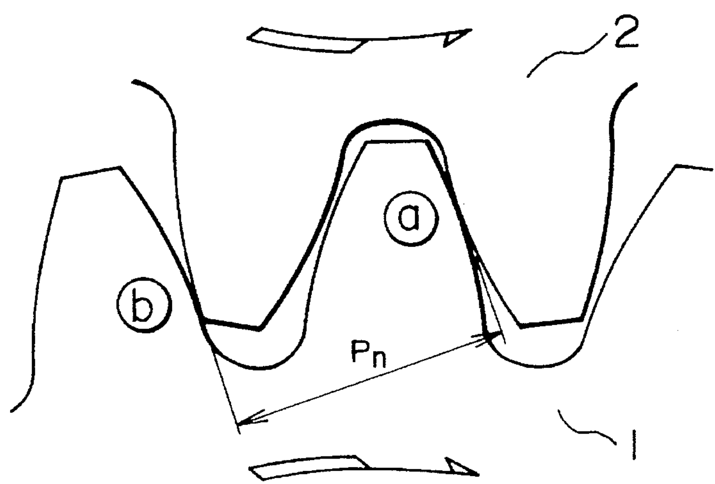
FIG. 4 is a prior art diagram explaining the principle of the meshing of a sun gear with the planet gear when a load is not applied.
Figure 5:
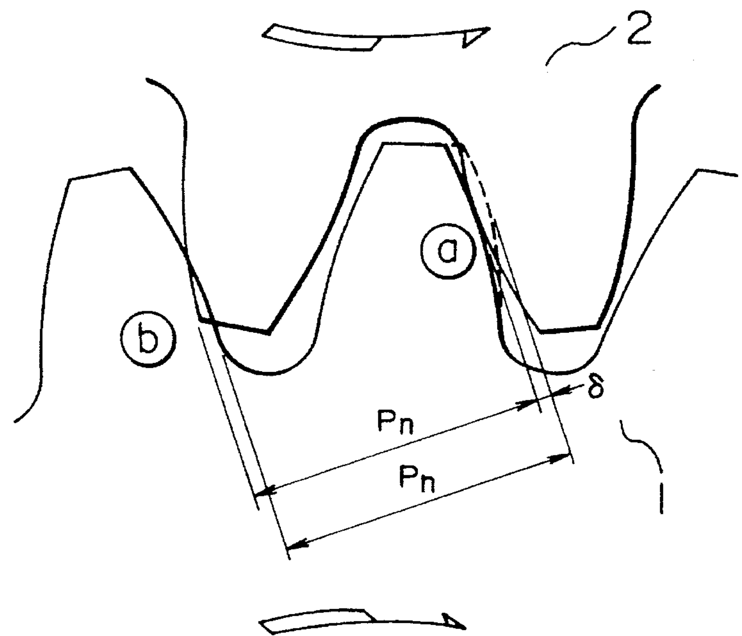
FIG. 5 is a prior art diagram explaining the operation principle of the starting of meshing of the sun gear with the planet gear when a load is applied.
Figure 6:
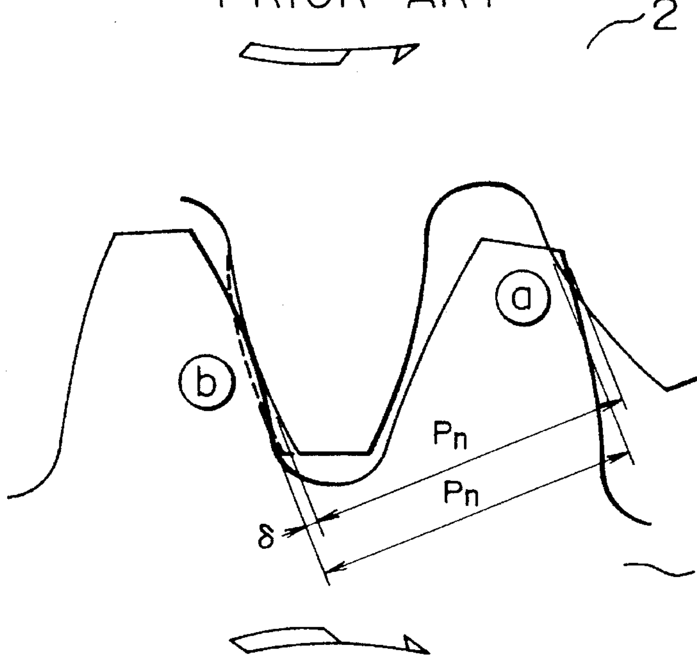
FIG. 6 is a prior art diagram explaining the operation principle of the end of mesh of the sun gear with the planet gear when a load is applied.
Figure 7:
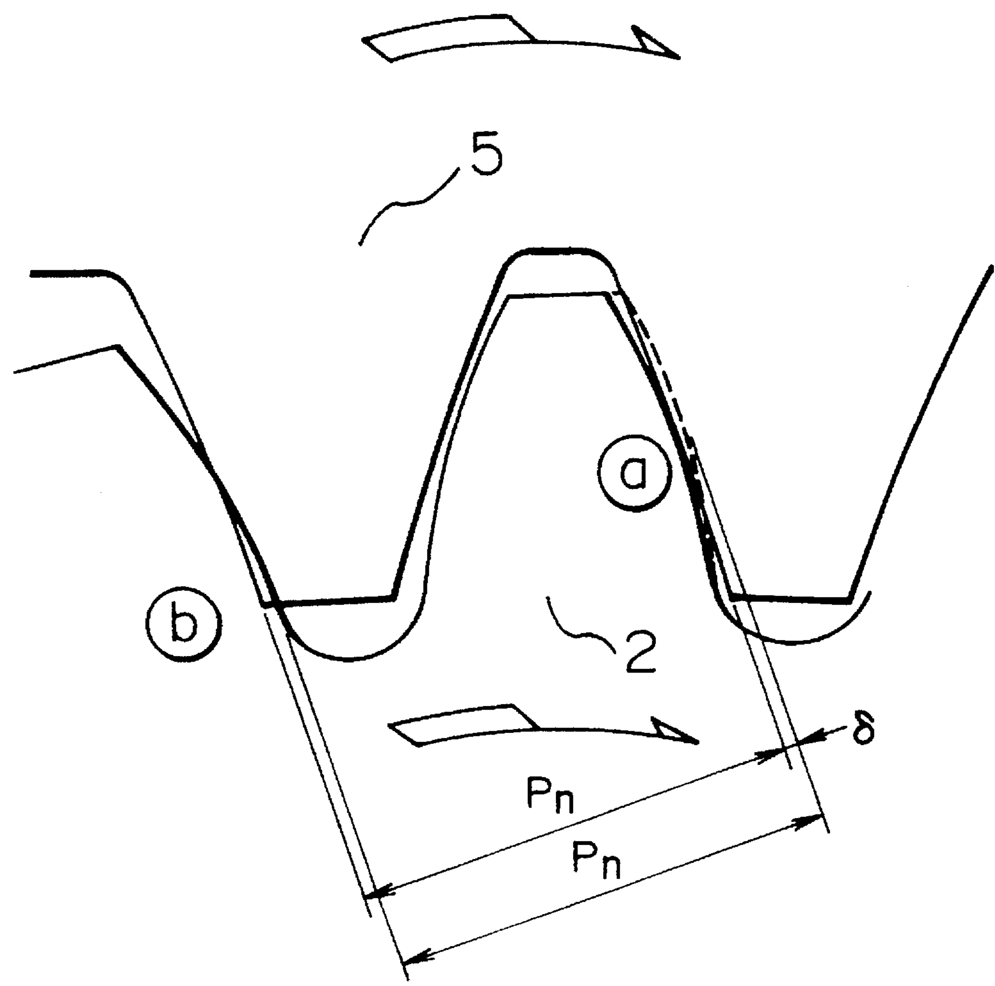
FIG. 7 is a prior art diagram explaining the principle of meshing of the planet gear with an internal gear when a load is applied.

As apparent from FIG. 3, the teeth faces on one side of the planet gears 2 mesh with the teeth faces of the sun gear 1 and the tooth faces on the opposite side of the planet gears 2 mesh with the teeth faces of the internal gear 5. As shown in FIG. 1, the tooth profile on the one side of the planet gear 2 is corrected in accordance with its deflection caused by the meshing thereof with the sun gear 1 and the tooth profile on the opposite side of the planetary gear 2 is corrected in accordance with its deflection caused by the meshing thereof with the internal gear 5. In FIG. 1, $X_1$ represents an amount of correction of the tooth profile of the dedendum of the teeth faces of the planet gears 2 meshing with the sun gear 1, $X_2$ represents an amount of correction of the tooth profile of the addendum of the teeth faces of the planet gear 2 meshing with the sun gear 1, $X'_1$ represents an amount of correction of the tooth profile of the dedendum of the teeth faces of the planet gear 2 meshing with the internal gear 5, $X'_2$ represents an amount of correction of the tooth profile of the addendum of the teeth faces of the planet gear 2 meshing with the internal gear 5, h represents a tooth height, $h_1$ represents a height of a point from which the tooth profile of the dedendum of the teeth faces of the planet gear 2 meshing with the sun gear 1 is corrected, $h_2$ represents a height of a point from which the tooth profile of the addendum of the teeth faces of the planet gear 2 meshing with the sun gear 1 is corrected, $h'_1$ represents a height of a point from which the tooth profile of the dedendum of the teeth faces of the planet gear 2 meshing with the internal gear 5 is corrected, and $h'_2$ represents a height of a point from which the tooth profile of the addendum of the teeth faces of the planet gear 2 meshing with the internal gear 5 is corrected. The tooth profile of the planet gear 2 is corrected so that it has a relationship $X_1>X_1'$, $X_2>X_2'$.

According to the planetary gear device of this embodiment, the tooth profile of the teeth faces on the one side of the planet gear 2 is corrected in accordance with its deflection caused by the meshing thereof with the sun gear 1 and the tooth profile of the teeth faces on the opposite side of the planet gear 2 is corrected in accordance with its deflection caused by the meshing thereof with the internal gear 5. As a result, since the correction of the tooth profile can be performed so that it is optimum for each of the two kinds of meshing in the planetary gear device of the sun gear 1 with the planet gears 2 and the planet gears 2 with the internal gear 5, rotary motion can be smoothly transmitted between the sun gear 1 and the planet gears 2 and between the planet gears 2 and the internal gear 5 while suppressing impact vibration to lower vibration and noise as a whole.

Further, since it is sufficient to correct the tooth profile of the planetary gears 2, the design, manufacture and management of parts can be easily carried out.

Figure 2:
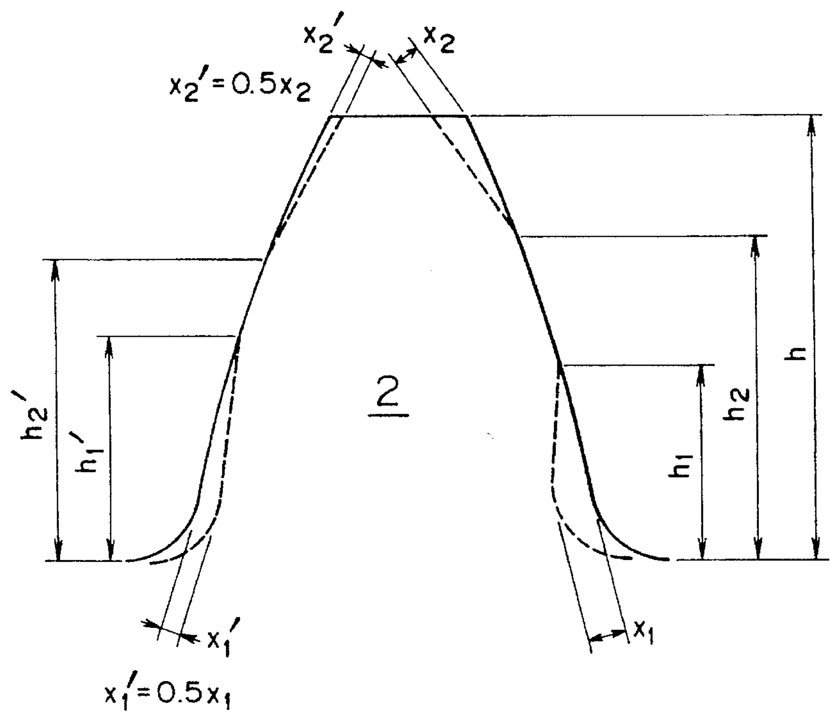
FIG. 2 is a diagram explaining the correction of the tooth profile of the planet gear of another embodiment of the present invention.

Next a second embodiment of the present invention is described with reference to FIG. 2. As shown in FIG. 2, this embodiment has an amount of correction of the tooth profile of the teeth faces of a planet gear 2 meshing with an internal gear 5 set to about one-half an amount of correction of the tooth profile of the teeth faces of the planet gear 2 meshing with a sun gear 1. More specifically, a relationship $X_1'=0.5X_1$, $X_2'=0.5X_2$ is established. The reason why this relationship is employed is that when an amount of correction of the tooth profile of the teeth faces of the planet gear 2 meshing with the internal gear 5 is calculated with respect to various cases, the amount of correction ranges from 40% to 60% of an amount of correction of the tooth profile of the teeth faces of the planet gear 2 meshing with the sun gear 1 in almost all the cases. This is because that when the planet gear 2 meshes with the internal gear 5, a loading point is located near to the dedendum of the teeth of the planet gear 2. The arrangement of this embodiment other than the above is the same as that of the first embodiment.

In the second embodiment, an amount of correction of the tooth profile of the planet gear 2 due to the meshing thereof with the internal gear 5 can be determined only by calculating an amount of correction of the tooth profile of the profile gear 2 due to the meshing thereof with the sun gear 1. Therefore the amount of correction of the tooth profile can be determined by performing the calculation only once. Therefore, the second embodiment has the effect that the design, manufacture and management of parts can be more easily carried out.

We claim:

1. A planetary gear device including a sun gear, planet gears meshing with the sun gear and an internal gear meshing with the planet gears with each tooth of the planet gears having two load carrying faces, each gear having a tooth profile formed to an involute curve, teeth surfaces of the planet gears having a different amount of profile correction of the teeth faces of each tooth based on an amount of deformation of the teeth faces of the planet gears caused by meshing with the sun gear and the internal gear, said profile corrections including decrease profile corrections of the dedendum of the teeth faces and wherein an amount of correction of the tooth profile of a dedendum of the teeth faces of the planet gears meshing with the sun gear is greater than an amount of correction of the tooth profile of the dedendum of the teeth faces of the planet gears meshing with the internal gear, whereby rotary motion is smoothly transmitted when the teeth faces of the planet gears mesh with the sun gear and the internal gear during elastic deformation of the teeth caused by the meshing thereof.

2. A planetary gear device according to claim 1, wherein:

the amount of profile correction of the addendum of the teeth faces of the planet gears meshing with the internal gear is smaller than an amount of correction of the addendum of the teeth faces of the planet gears meshing with the sun gear.

3. A planetary gear device according to claim 1, wherein:

a maximum amount of deviation of the profile correction of teeth faces of the planet gears meshing with the internal gear is one half of an amount of correction of the teeth faces of the planet gears meshing with the sun gear.

4. A planetary gear device including a sun gear, planet gears meshing with the sun gear and an internal gear meshing with the planet gears, each gear having a tooth profile formed to an involute curve with a tooth profile of the teeth formed on the planet gears being corrected to establish a relationship $$X_1>X_1', X_2>X_2'$$

so that rotary motion is smoothly transmitted when the teeth faces of the planet gears meshing with the sun gear and the teeth faces of the planet gears meshing with the internal gear during elastical deformation of the teeth caused by the meshing thereof;

wherein, $X_1$ is an amount of correction of the tooth profile of a dedendum of the teeth faces of the planet gears meshing with the sun gear;

$X_2$ is an amount of correction of the tooth profile of the addendum of the teeth faces of the planet gears meshing with the sun gear;

$X_1'$ is an amount of correction of the tooth profile of the dedendum of the teeth faces of the planet gears meshing with the internal gear; and $X_2'$ is an amount of correction of the tooth profile of the addendum of the teeth faces of the planet gears meshing with the internal gear.

5. A planetary gear device according to claim 4 wherein:

$$X_1'=0.5X_1, \text{ and } X_2'=0.5X_2.$$

6. A planetary gear device according to claim 4 wherein: $X_1'$ equals between $0.4X_1$, and $0.6X_1$, and $X_2'$ equals between $0.4X_2$ and $0.6X_2$.

7. A planetary gear device including a sun gear, planet gears meshing with the sun gear and an internal gear meshing with the planet gears with each tooth of the planet gears having two load carrying faces, each gear having a tooth profile formed to an involute curve with a tooth profile of the planet gears being corrected to establish a relationship $$X_1>X_1', X_2>X_2'$$

so that rotary motion is smoothly transmitted when the teeth faces of the planet gears meshing with the sun gear and the teeth faces of the planet gears meshing with the internal gear during elastic deformation of the teeth caused by the meshing thereof;

wherein, $X_1$ is an amount of correction of the tooth profile of a dedendum of the teeth faces of the planet gears meshing with the sun gear;

$X_2$ is an amount of correction of the tooth profile of the addendum of the teeth faces of the planet gears meshing with the sun gear;

$X_1'$ is an amount of correction of the tooth profile of the dedendum of the teeth faces of the planet gears meshing with the internal gear; and $X_2'$ is an amount of correction of the tooth profile of the addendum of the teeth faces of the planet gears meshing with the internal gear.

8. A planetary gear device according to claim 7 wherein:

$$X_1'=0.5X_1, \text{ and } X_2'=0.5X_2.$$

9. A planetary gear device according to claim 7 wherein: $X_1'$ equals between $0.4X_1$, and $0.6X_1$, and $X_2'$ equals between $0.4X_2$ and $0.6X_2$.

* * * * *